United States Patent
Jarvis et al.

(10) Patent No.: US 8,087,851 B1
(45) Date of Patent: Jan. 3, 2012

(54) PROCESS FOR HANDLING POWDERED MATERIAL

(76) Inventors: R. Darren Jarvis, Paducah, KY (US); Michael T. Eck, Paducah, KY (US)

(*) Notice: Subject to any disclaimer, the term of this patent is extended or adjusted under 35 U.S.C. 154(b) by 308 days.

(21) Appl. No.: 11/741,515

(22) Filed: Apr. 27, 2007

Related U.S. Application Data (60) Provisional application No. 60/795,345, filed on Apr. 27, 2006.

(51) Int. Cl.
*B65G 53/34* (2006.01)
(52) U.S. Cl. .................................. 406/194; 406/137
(58) Field of Classification Search .............. 406/51, 406/52, 53, 56, 86, 88, 89, 90, 122, 134, 406/136, 137, 138, 168, 171, 172
See application file for complete search history.

(56) References Cited

U.S. PATENT DOCUMENTS

| | | | |
|---|---|---|---|
| 1,355,444 A | 10/1920 | Baxter | |
| 1,839,456 A * | 1/1932 | Anderson | 366/107 |
| 2,274,708 A * | 3/1942 | Kennedy | 406/137 |
| 2,321,015 A | 6/1943 | Davis | |
| 2,673,125 A * | 3/1954 | Squire, Jr. | 406/137 |
| 3,219,394 A * | 11/1965 | Moss et al. | 406/171 |
| 3,230,016 A * | 1/1966 | Gilbert et al. | 406/124 |
| 3,236,565 A | 2/1966 | Kester et al. | |
| 3,498,003 A * | 3/1970 | Hulbert, Jr. | 406/168 |
| 3,582,046 A * | 6/1971 | Mueller et al. | 366/106 |
| 3,588,180 A * | 6/1971 | Herr | 406/60 |
| 3,602,552 A | 8/1971 | Morgan | |
| 3,667,814 A | 6/1972 | Krivda | |
| 3,788,527 A * | 1/1974 | Matson | 222/195 |
| 3,929,261 A | 12/1975 | Solimar | |
| 3,953,077 A | 4/1976 | Kulyabko et al. | |
| 4,059,311 A | 11/1977 | Spitzer et al. | |
| 4,165,820 A | 8/1979 | Dugge et al. | |
| 4,183,702 A | 1/1980 | Bonnel | |
| 4,189,262 A | 2/1980 | Anderson | |
| 4,225,033 A | 9/1980 | Fukagai et al. | |
| 4,346,822 A | 8/1982 | Wadensten et al. | |
| 4,420,279 A | 12/1983 | Easley, Jr. | |
| 4,466,558 A | 8/1984 | Dugge et al. | |
| 4,473,327 A * | 9/1984 | Delfs | 406/60 |

(Continued)

OTHER PUBLICATIONS

Diamondback Technology, Inc., Diamondback Air Permeation Unit Installation and Operations Manual Apr. 2005, 14 pages, Atascadero, California.

*Primary Examiner* — Gene Crawford
*Assistant Examiner* — William R Harp
(74) *Attorney, Agent, or Firm* — Laura M. Hagan (57) ABSTRACT

Described is a process for conveying a powdered material from a storage bin to a delivery destination. The process utilizes an air permeation system within a hopper to facilitate the flow of material. Intermittent blasts of high pressure air are used to clean the air permeation nozzles. After the material flows from the hopper, a screw feeder with a variable speed motor is utilized for processing the material. The powdered material is then guided to a flow measurement instrument which measures the flow of the material through the process. The variable speed motor is responsive to the measurements made by the flow measurement instrument. The material is then transferred into a powdered material feeder where it is pulled through the feeder with gravity and negative pressure. The powdered material feeder then moves the material into a rotary airlock where it is deposited into a pneumatic convey airline.

4 Claims, 7 Drawing Sheets

U.S. PATENT DOCUMENTS

| | | |
|---|---|---|
| 4,496,076 A | 1/1985 | Tompkins |
| 4,560,094 A | 12/1985 | Eales |
| 4,739,964 A | 4/1988 | Hutt |
| 4,813,818 A * | 3/1989 | Sanzone ................... 406/122 |
| 4,826,361 A * | 5/1989 | Merz ........................ 406/60 |
| 4,941,779 A | 7/1990 | Dewitz et al. |
| 4,958,741 A | 9/1990 | Johanson |
| 4,969,494 A | 11/1990 | Chefson |
| 5,052,874 A | 10/1991 | Johanson |
| 5,071,289 A | 12/1991 | Spivak |
| 5,435,442 A * | 7/1995 | Howell ..................... 209/139.1 |
| 5,615,987 A * | 4/1997 | Weist ........................ 414/218 |
| 5,769,571 A | 6/1998 | Higuchi |
| 6,068,429 A | 5/2000 | Schultheis |
| 6,251,152 B1 * | 6/2001 | Thiele ....................... 55/318 |
| 7,137,759 B1 * | 11/2006 | Ambs ........................ 406/55 |
| 2008/0279641 A1 * | 11/2008 | Critelli ....................... 406/137 |

* cited by examiner

PROCESS FOR HANDLING POWDERED MATERIAL

This application claims priority to U.S. Provisional Patent, Ser. No. 60/795,345 filed on Apr. 27, 2006.

This application was funded by an award from the Kentucky Science and Technology Corporation under Contract # 146-403-170.

SUMMARY

This application relates to a process for handling and conveying a powdered material from a large capacity storage bin to a burner or other delivery destination. The present process is able to keep the flow of the powdered material at a steady rate by allowing air which is entrapped in the powdered material to be removed or to escape throughout the process, and it also provides a system which allows for continuous monitoring of the feed rate of the powdered material. The process starts with a large capacity storage bin as a silo for storing powdered materials. Typically, this storage bin will utilize a conical wedge or modular mass flow hopper at the bottom end to assist with the flow of the powdered material from the bin. The present process utilizes a hopper with an air permeation system used to facilitate the flow of the powdered material from the exit port of the hopper. The air permeation system utilizes low flow air permeation with intermittent blasts of high pressure air to clean the air nozzles of the system, thus maintaining its effectiveness.

Below the exit port of the hopper is a variable rate feeder means for metering the powdered material out at a controlled rate. A pneumatically operated resistance gate is present at the material outlet for the feeder means. This gate resists opening and serves to further compact the powdered material, while any air entrapped in the powdered material escapes through a de aeration vent which is in communication with the trough of the feeder means.

Once the powdered material exits the material outlet of the feeder means, it enters into a guide tube of a material flow measuring instrument, such as an impact scale, which is used for monitoring the flow of the powdered material on an instantaneous and continuous basis. Upon exiting the material flow measuring instrument, the powdered material enters a powdered material feeder.

The powdered material feeder creates a negative pressure at the end of its chute, which serves to pull the powdered material through the powdered material feeder and also removes any air from the powdered material and the rotary airlock. This negative pressure extends beyond the chute of the powdered material feeder and on up through to the guide tube for the material flow measuring instrument. This negative pressure, though slight, helps to maintain most of the process under a vacuum, which also facilitates flow of the powdered material.

After leaving the material outlet for the powdered material feeder, the powdered material is dispensed into a rotary airlock, which then dispenses it into a pneumatic conveying system which conveys it into a burner. One use for the present process is with indirect fired burning systems for powdered material, such as pulverized fuel. The process could be used for feeding most any dry powdered material into a gas stream or other delivery destination when a smooth and predictable flow rate is required.

One object of the present process is to provide a process that allows for consistent feed of powdered material to a delivery system, such as a convey line. Another object is to provide a process which conducts continuous monitoring of the flow of the powdered material as it moves through the process.

BRIEF DESCRIPTION OF THE DRAWINGS

Reference to the figures discloses a process for handling powdered materials and is not to be interpreted as limiting the scope of the present invention, as similar processes and methods of use will become known by persons having ordinary skill in the art upon a reading of the present disclosure.

DETAILED DESCRIPTION OF THE PROCESS/INVENTION

Figure 1:
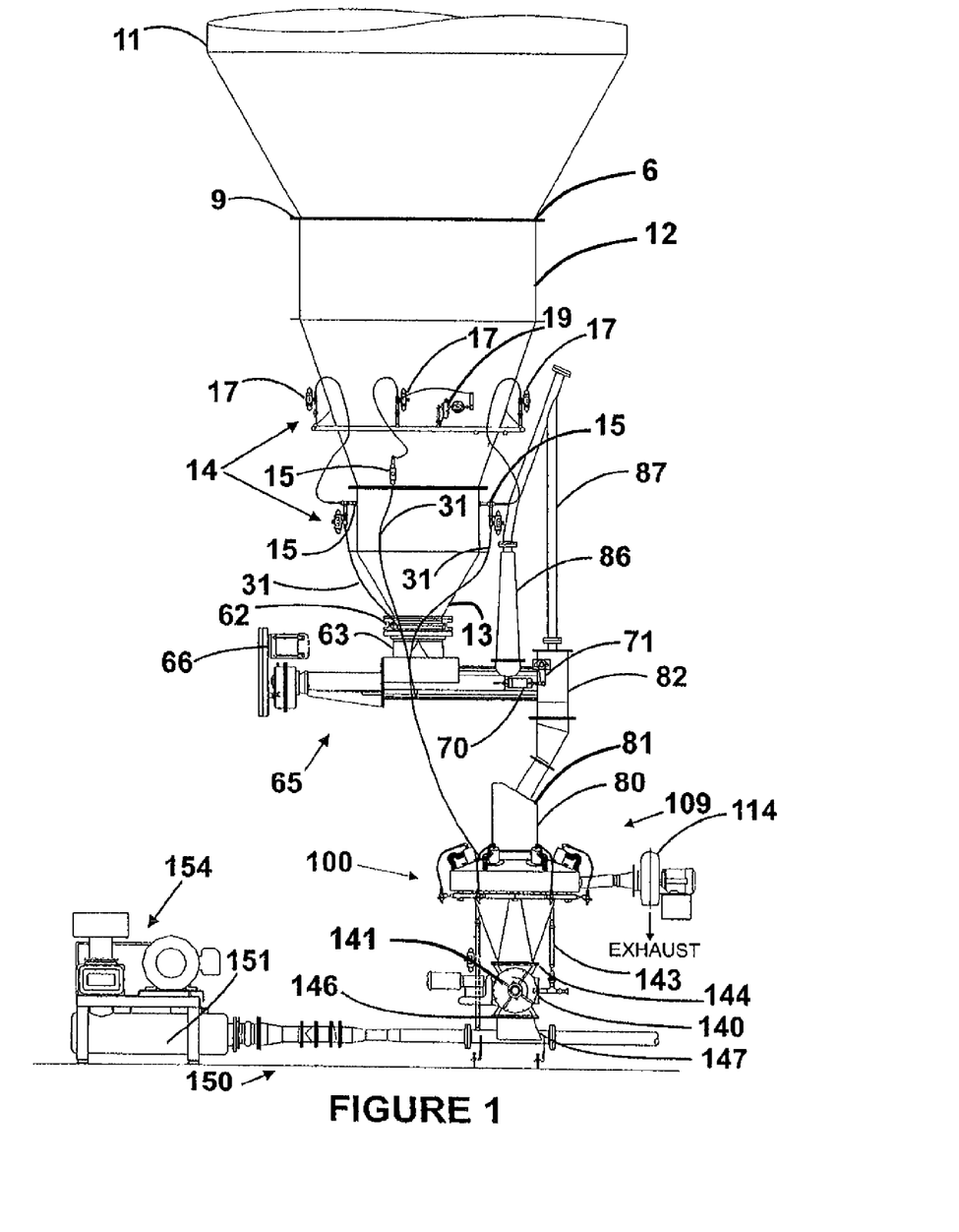
FIG. 1 is an elevational view of the apparatus which can be utilized for the practice of the process, certain components of the apparatus being partly broken away.

FIG. 1 discloses a view of the apparatus used in the process for conveying powdered material. Powdered material is typically stored in a large capacity material storage bin 11, such as a silo. Storage bins 11 can range in volume and size. A typical range of volume may be between 1,000 cu ft to 10,000 cu ft or greater. The present process allows for the direct feed of powdered material out of a large capacity storage bin 11 to be used in a conveying process to various destinations, such as a kiln for burning.

The present process, as is disclosed in FIG. 1, densifies, or removes the air from, the powdered material prior to the conveying or feeding of the material to its destination, such as a kiln or burner. Removing air from the powdered material makes it have a more consistent and predictable bulk density and thus a smoother feed rate. One factor involved in the de-aeration of the powdered material used in the present process is that by using a single larger capacity storage bin 11, a large head of powdered material is above the exit port 13 of the hopper 12, which helps the powdered material to begin to de-aerate and approach a consistent and predictable bulk density prior to reaching the feeder means.

Other processes which handle powdered material may utilize a "batch" storage bin or hopper system. The batch system uses two storage bins with hoppers, which includes a larger storage bin with a hopper for bulk storage and a smaller bin with a hopper used to transfer the powdered material to the convey system. The smaller storage bin is necessary to obtain an accurate weight measurement to determine the amount of powdered material being processed. The larger capacity storage bin is used to frequently refill the smaller capacity storage bin, which must occur often and thus allows for less time for the powdered material to de-aerate. When a smaller sized storage bin is used, a shorter head of powdered material is present above the exit port of the hopper, which is less effective at de-aerating the powdered material.

Large capacity storage bins 11 have a top end and a bottom end, 9. Many large capacity storage bins 11 bins utilize a hopper 12 at the bottom end 9 of the storage bin 11 to assist with the flow of the stored material. A hopper 12 is typically a conical wedge shaped unit which is designed to promote the flow of materials. The hopper 12 may be made from stainless steel or any similar type of coating known in the industry, which can be polished to a slick interior finish and thus assist in promoting the flow of the powdered material out of the hopper 12. In an advantageous embodiment of the present process, a modular mass-flow bin is utilized as a hopper 12, as is shown in FIG. 1. The modular mass-flow bin is a large capacity hopper that is formed by joining two or more bin modules of similar shape. The linear dimensions of the modules increase in a geometric series, with the smallest module being at the bottom. The modules are designed to prevent arching of the particular material in the bin to assure mass flow. The modular mass-flow bin is described in particular in U.S. Pat. No. 4,958,741, which is hereby incorporated in its entirety by reference.

In any hopper 12 to be utilized by the present process, the hopper 12 has a top end and an exit port which are connected by a sidewall. The top end of the hopper 6 connects to the bottom end of the storage bin 9. The present process utilizes a self-cleaning air permeation system 14, which delivers controlled low pressure gas to points in the hopper's sidewall 7 to enhance the flow of the dry powdered material and helps to prevent arching or bridging of the powdered material over the exit port of the hopper 13.

Figure 2:
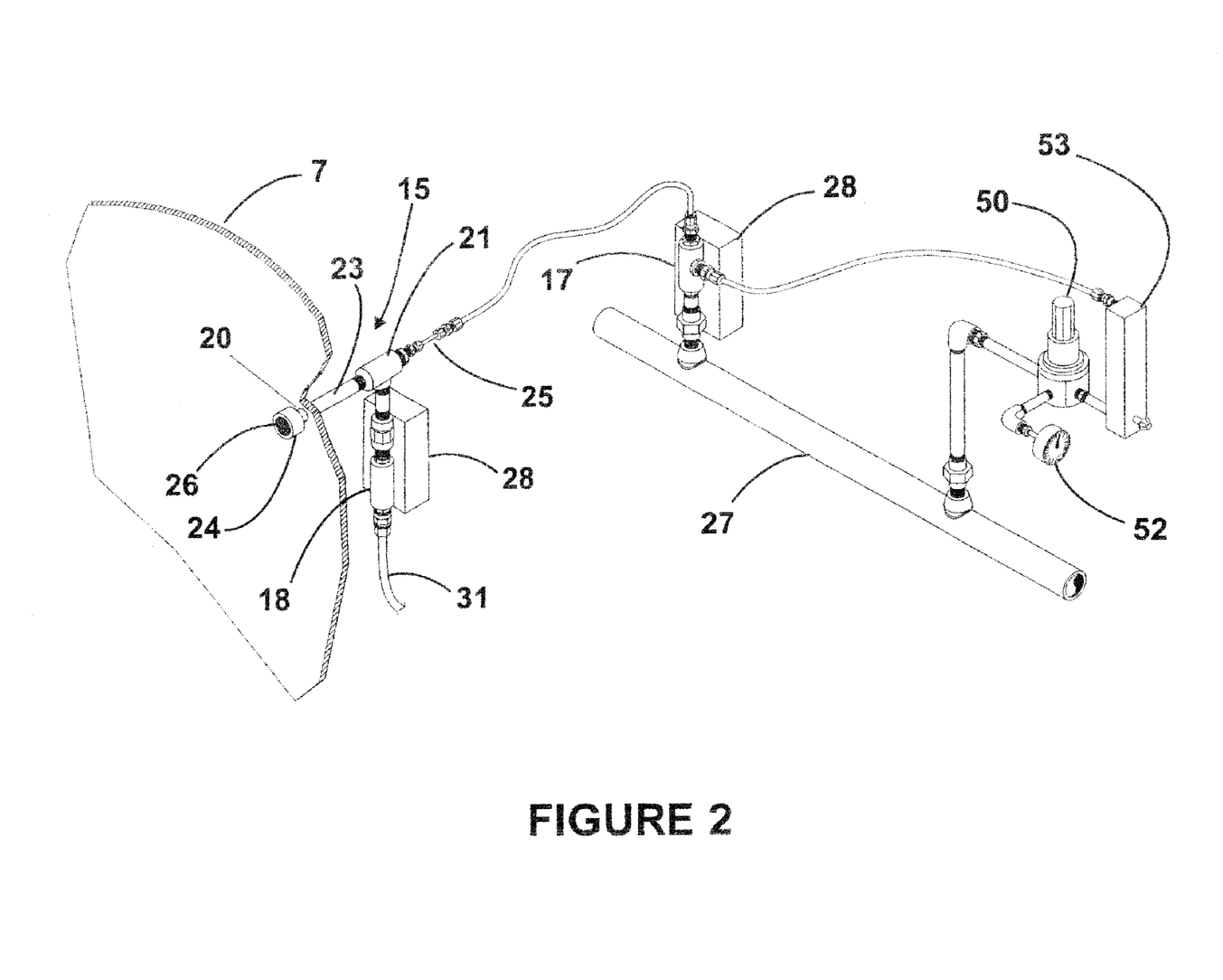
FIG. 2 is a perspective view of the air permeation system utilized by the process.

The air permeation system 14, as show in FIG. 2, is placed above the exit port of the hopper 13 and consists of a plurality of air permeation nozzles 15. The plurality of air permeation nozzles 15 are mounted on the hopper sidewall 7 at spaced apart intervals about the periphery thereof. Each of the air permeation nozzles 15 has a first end 20, a second end 21 and a sidewall 23 connecting the two ends 20, 21. The first end 20 of the nozzle 15 has a head section 24, which has a densely woven metal screen 26 affixed to it and is inserted though the hopper sidewall 7. The second end 21 of the air permeation nozzle 15 extends outside of the hopper 12 and may be held in place by a nozzle coupling welded to the exterior of the hopper 12. Extending from the sidewalls of the air permeation nozzles 23, which are outside of the hopper 12, are dump valves 18. The dump valves 18 may be two-way or three-way valves or any equivalent thereof. Connected to the second end 21 of the air permeation nozzles are air lances 25, cleaning valves 17 and regulator assemblies 19. The cleaning valves 17 may be three-way valves or any equivalent thereof. Both the cleaning and dump valves 17, 18 are automatic in nature and controlled by an actuator 28 or an equivalent thereof.

Figure 3:
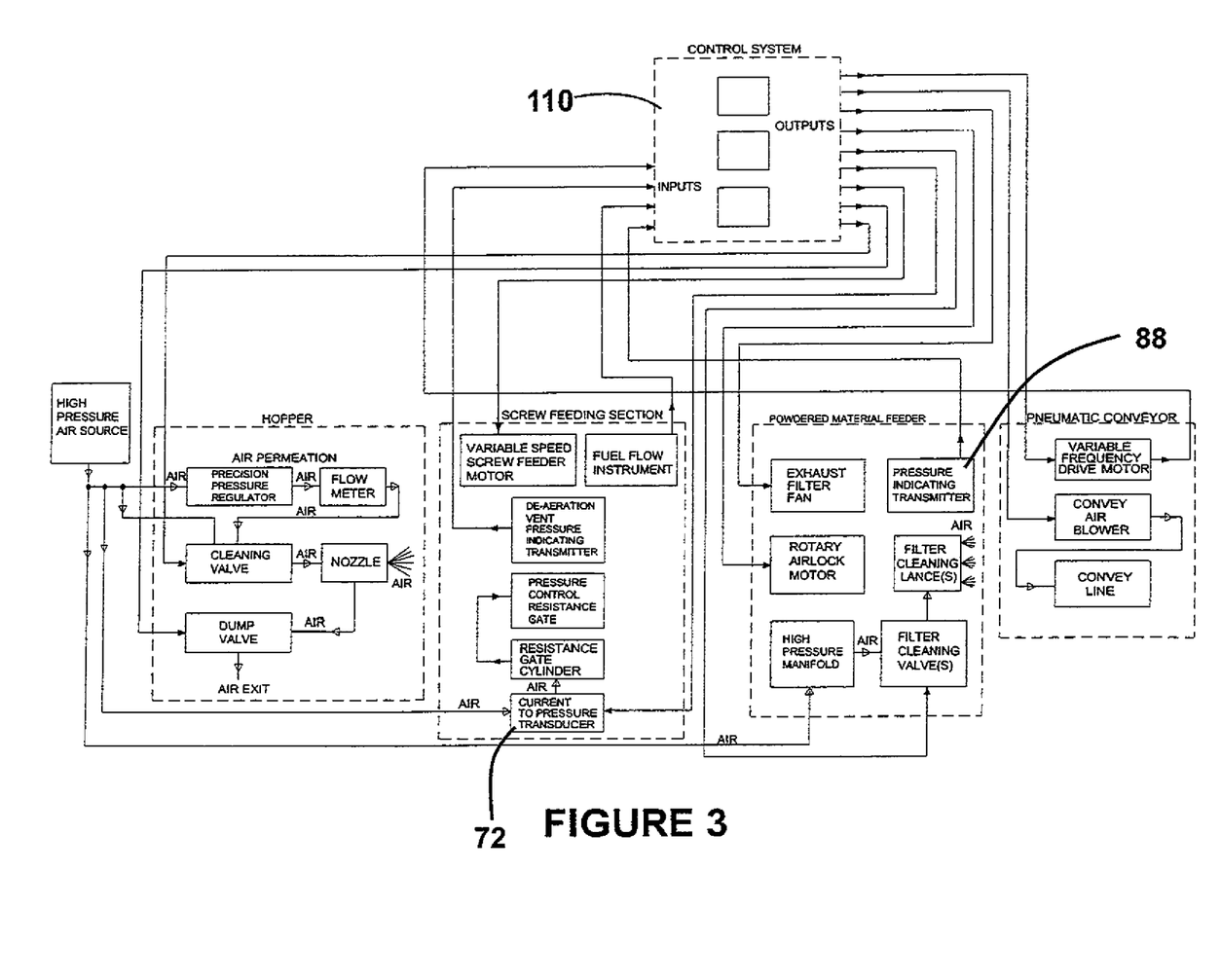
FIG. 3 is a block diagram of a control system for the process showing input and output.
Figure 4:
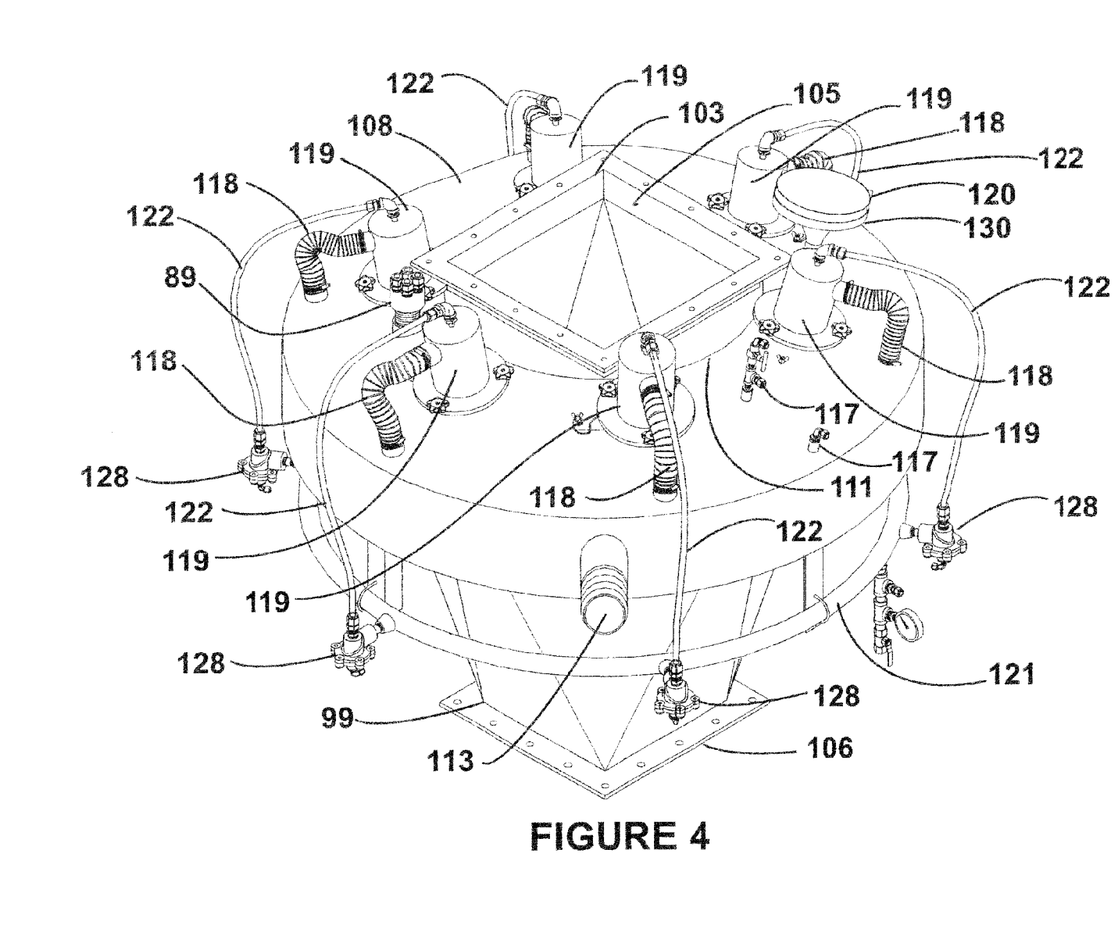
FIG. 4 is a perspective view of the powdered material feeder utilized by the process.

Each of the dump valves 18 has an inlet and an outlet and connects to an exit line 31 which may lead to outside the process or to the powdered material feeder 100 of the present process. The cleaning valves 17 are connected to the air permeation nozzles 15 through an air lance 25 and are in direct communication with both a high pressure air source 27 and a regulator assembly 19. Both the dump valves 18 and cleaning valves 17 are responsive to signals from a controller which operates the dump valves 18 and cleaning valves 17 on schedule and in proper sequence. Circuitry for implementing the activation of the dump valves 18 and cleaning valves 17 or their equivalents are well known and can be applied by those skilled in the electronic arts. FIG. 3 discloses a block diagram illustrating a control system for the present process.

The regulator assemblies 19 which are in communication with the cleaning valves utilize a gas pressure regulator 50, a pressure gauge 52 and a flow indicating meter 53. A flow indicating meter 53 may not be utilized if the pressure in the gas pressure regulator 50 is set to the specific rate. The regulator assemblies 19 are in flow communication with a high pressure air source 27.

The air permeation system 14 uses pressure regulated gas with intermittent blasts of high pressure air for cleaning the air permeation nozzles 15. The low pressure air is directed from the high pressure air source 27 through the regulator assembly 19 and through the cleaning valve assembly 17 to the air permeation nozzle 15. When low pressure air is utilized by the air permeation system 14, the cleaning valve 17 is positioned for blocking the path from the high pressure air source 27 and allowing the passage connecting to the regulator assembly 19 to be open. The high pressure air received by the regulator assembly 19 from the high pressure air source 27 is regulated to low pressure air which is delivered to the air permeation nozzles 15 into the hopper 12 through the cleaning valve 17. This low pressure air provides air permeation of the powdered material within the hopper 12. When low pressure air is being supplied through the air permeation nozzles 15, the dump valves 18 are positioned for blocking the path to the exit line 31 so that all the air is released into the hopper 12.

When the air permeation nozzles 15 are provided with low pressure air, powdered material often accumulates past the metal woven screen 26 in the head section of the nozzle 24. In order to maintain proper air permeation, the nozzles 15 must be cleaned regularly. The air permeation system 14 of the present invention utilizes intermittent blasts of high air pressure to clean the air permeation nozzles 15. During this cleaning phase, the cleaning valve 17 is positioned for blocking the path from the regulator assembly 19 and allowing the passage connecting directly to the high pressure air source 27 to be open. The high pressure air is directed from the high pressure air source 27 through the cleaning valve 17 to the air permeation nozzle 15.

When the cleaning phase is activated, the dump valve 18 is positioned so that the pathway to the exit line 31 is open. When the high pressure air comes through the air permeation nozzle 15, the metal woven screen 26 serves to repel a portion of the high pressure air, which causes the air and any accumulated powdered material in the head section 24 to flow through the open dump valve 18 and out the exit line 31. The exit line 31 of the dump valve 18 can be distributed directly to the negative pressure vessel 107 of the powdered material feeder 100 through an inlet port 89 or to the atmosphere.

By cleaning the accumulated powdered material from the head section of the nozzle 24, it allows the low pressure gas to be effective in aiding in the flow of the powdered material by preventing arching or bridging of the powdered material over the exit port of the hopper 13. Without the periodic cleaning of the air permeation nozzles 15, the accumulated powdered material in the head of the nozzle 24 inhibits the flow of the low pressure gas, thus rendering it ineffective in aiding the flow of powdered material.

After a pre-set cleaning time, the cleaning valve 17 is repositioned to block the air flow received directly from the high pressure air source 27 and opens the pathway from the regulator assembly 19. The dump valve 18 returns to a closed position so as to prevent air or powdered material from flowing through the exit line 31. The control circuitry regulates the timed sequence of opening and closing the dump valves 18 and cleaning valves 17 so that low pressure gas with intermittent blasts of high pressure gas is utilized by the air permeation system 14.

At the exit port of the hopper 13, a maintenance gate 62 is present. The maintenance gate 62 is a pneumatically operated knife gate, which is used to isolate the feeder means 65 from the large storage bin 11 and hopper 12 for maintenance while the storage bin 11 is being filled with powdered material. A pneumatically operated maintenance gate 62 located between the exit port of the hopper 13 and the material inlet of the feeder means 63 provides for tight shut-off of the powdered material and assists with de-aerating of the powdered material. The maintenance gate 62 may or may not be present on the exit port of the hopper 13.

After passing the maintenance gate 62, the powdered material enters a feeder means 65, which consists of an auger 64 which is driven by a motor 66. The feeder means 65 has a material inlet 63, a material outlet 67 and a trough 68 in which an auger 64 resides. The feeder means 65 feeds the powdered material at a controlled variable rate. The material inlet 63 is directly beneath the exit port of the hopper 13. In an advantageous embodiment of the present process, the feeder means 65 is a variable pitch de-aerating auger or a variable shaft diameter. A variable frequency drive can be used on the drive motor 66 to change the motor speed and thus the feed rate of the feeder means. A material flow measuring instrument 80 is connected to the motor 66 and provides the feedback to the variable frequency drive motor 66 to regulate the feed rate of the feeder means 65.

Figure 7:
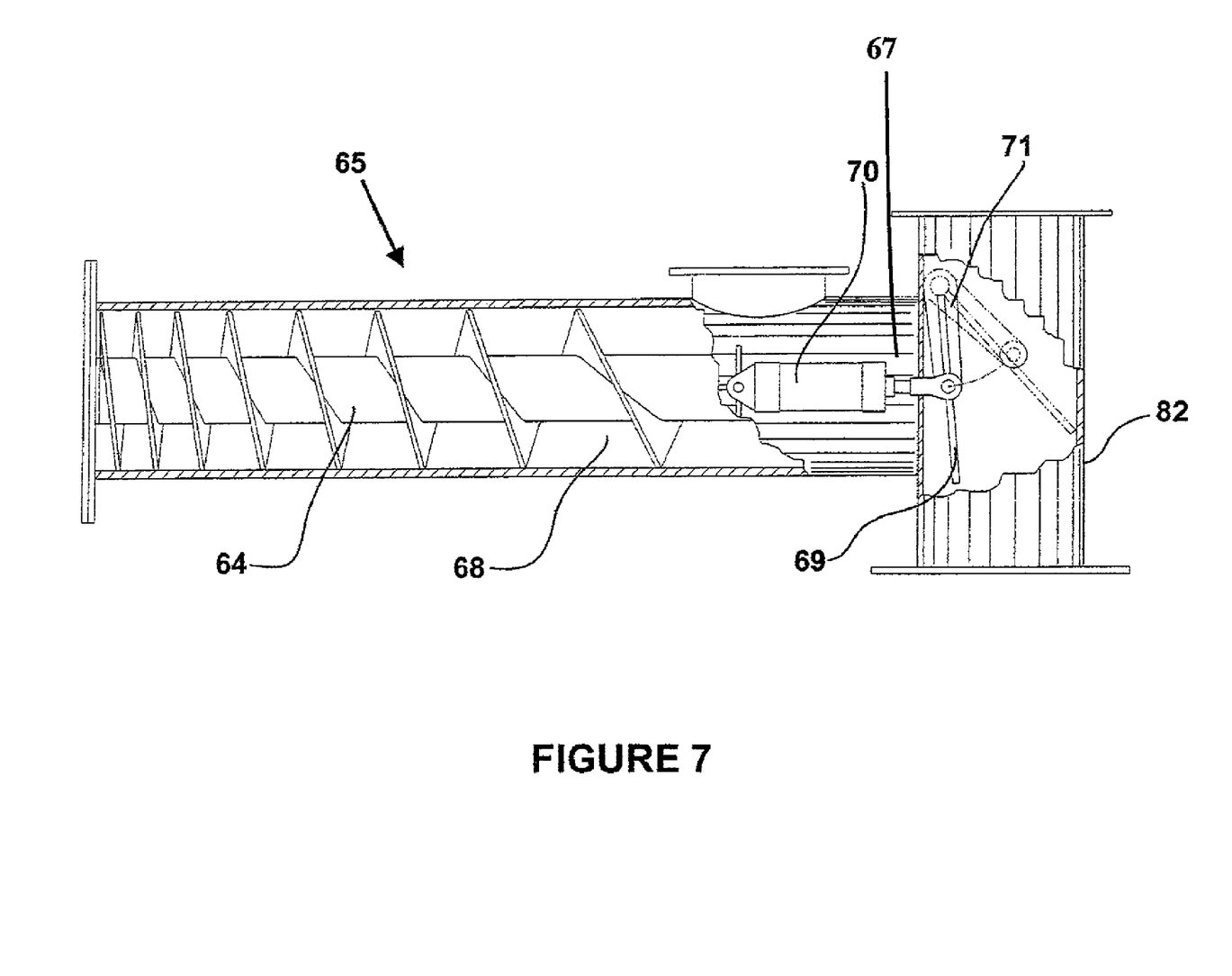
FIG. 7 is a cut-away view of the feeder means and the resistance gate.

At the material outlet 67 of the feeder means 65 is a pivoting resistance gate 69 as is shown in FIG. 7. The gate 69 naturally remains in the closed position. The gate 69 resists opening by a pneumatic cylinder 70 and a pivot arm 71. The air pressure in the pneumatic cylinder 70 can be increased to enhance the resistance of the resistance gate 69 from opening. The resistance gate 69 assists in de-aerating and densifying the powdered material as it is moved through the feeder means 65. A current to pressure transducer 72 is used to vary the pressure on the resistance gate pneumatic cylinder 70 with a variable analog signal.

By resisting the flow of the powdered material through the feeder means 65, the feeder means 65 is forced to fill completely. As the feeder means 65 continues to operate, the pressure in the trough 68 of the feeder means 65 increases until it overcomes the pressure of the pneumatically operated resistance gate 69, after which a steady flow of compacted powdered material emerges from the material outlet 67.

A de-aeration vent 86 is in communication with the trough 68 of the feeder means 65 near the material outlet 67. This venting mechanism allows the powdered material to de-aerate as it moves through the feeder means 65. The de-aeration vent 86 has a slight negative pressure, which is created due to the de-aeration vent's 86 connection to de-aeration vent line 87 which is connected to the material outlet 67 of the feeder means 65 beyond the resistance gate 69. This vent line 87 is essentially a pipe or similar type structure, which reconnects to the guide tube 82 leading to the material flow measuring instrument 80 and receives negative pressure from the exhaust fan 114.

A pressure indicating transmitter 88 may or may not be used to monitor the vacuum in the de-aeration vent 86. This pressure indicating transmitter 88 will detect a clogged de-aeration vent line 87 caused by an overfilling of the de-aeration vent 86. If the de-aeration vent 86 is of sufficient height and the vent line 87 steep enough, clogging of the de-aeration vent line 87 is unlikely.

A material flow measuring instrument 80 is used for the instantaneous and continuous monitoring of the powdered material flow coming directly out of the material outlet 67 of the feeder means 65. In an advantageous embodiment of the present process, the material flow measuring instrument 80 may be an impact scale/impact flow meter or a similar instrument. The material flow measuring instrument 80 is enclosed within a housing 81 and has a material guide tube 82 in communication with the material outlet 67 of the feeder means 65. The material guide tube 82 directs the powdered material onto an angled sensing plate. A sensing plate is mounted to a spring-loaded, silicon-filled damper arm that moves linearly as material flows over the sensing plate. A Linear Variable Differential Transformer (LVDT) measures the linear displacement of the sensing plate caused by the flow of the powdered material over the plate. A LVDT is a common type of electromechanical transducer that can convert the rectilinear motion of an object to which it is coupled mechanically into a corresponding electrical signal. The linear displacement of the sensing plate is converted to an equivalent tons/hr feed rate inside an impact scale integrator. The flow of the powdered material is measured on a second-by-second basis as the powdered material falls from the feeder means 65. A controller source can be used to connect the material flow measuring instrument 80 to the drive motor 66 for the feeder means 65. The speed of the drive motor 66 controlling the feeder means 65 is thus responsive to the measurements of the material flow measuring instrument 80. Circuitry for implementing the control loop to/from the material flow measuring instrument 80 to the drive motor 66 for the feeder means 65 or their equivalents are well known and can be applied by those skilled in the electronic arts. The LVDT conditioner card and the integrator are mounted in a conditioned compartment adjacent to the housing 81 which encloses the sensing plate.

By using the material flow measuring instrument 80 located below the feeder means 65, the powdered material flow, or the feed rate, can be continuously and instantaneously measured. Other systems, such as the batch hopper system, use weigh elements or load cells associated with the hopper and cannot measure material flow when the hopper is being refilled. Additionally, by having the material flow measuring instrument 80 below the feeder means 65, it can monitor the flow directly from the feeder means 65, as opposed to other batch hopper systems which average the weight loss in the hopper over a period of time, which could contain significant spikes and/or dips in the flow of the powdered material.

Powdered material exits through the discharge outlet 85 of the material flow measuring instrument 80 which is in flow communication with the material inlet 105 of chute 104 of the powdered material feeder 100. The powdered material feeder 100 may be comprised of a chute 104 which has a top end 103 forming a material inlet 105 and a bottom end 102 with sidewall 60 therebetween. The open bottom end 102 of the chute 104 is in flow communication with a negative pressure vessel 107 and pulls the powdered material and the air entrapped in the powdered material downward toward the bottom end of the chute 102. The negative pressure vessel 107 is in flow communication with a negative pressure source 109, which can be a compartment or a tank 112 in conjunction with an exhaust fan 114.

The negative pressure vessel 107 is also in flow communication with a plurality of filter elements 119 contained within the vessel. The filter elements 119 maintain the flow communication with the negative pressure vessel 107 during the present process. The filter elements 119 are also in flow communication with a valve 128, which is in flow communication with a high pressure air source 121. The valves 128 connected to the high pressure air source 121 are suitably fitted to provide intermittent flow communication from the high pressure air source 121 to the interior of the filter elements 119, so as to remove any powdered material which has collected on the filter elements 119. The valves 128 are actuated by a control system 110 which provides for a schedule and sequence for providing the high pressure air to the filter elements 119.

The structure for the powdered material feeder 100 may take various forms. The structure of the powdered material feeder 100 may be configured so that the negative pressure vessel 107 surrounds the chute 104 using the outer surface of the sidewall 61 of the chute 104 as the inner surface 73 of an inner sidewall 74 for the negative pressure vessel 107. The outer sidewall 75 of the negative pressure vessel 107, depending below the sidewall 60 of the chute 104, allows for a flow communication between the negative pressure vessel 107 and the chute 104.

The outer surface 76 of the negative pressure vessel 107 may also form the inner sidewall 77 of the tank or compartment 112 of the negative pressure source 109, allowing for close proximity of the negative pressure vessel 107 and the negative pressure source 109 so as to allow various means to provide flow communication between the two.

Figure 6:
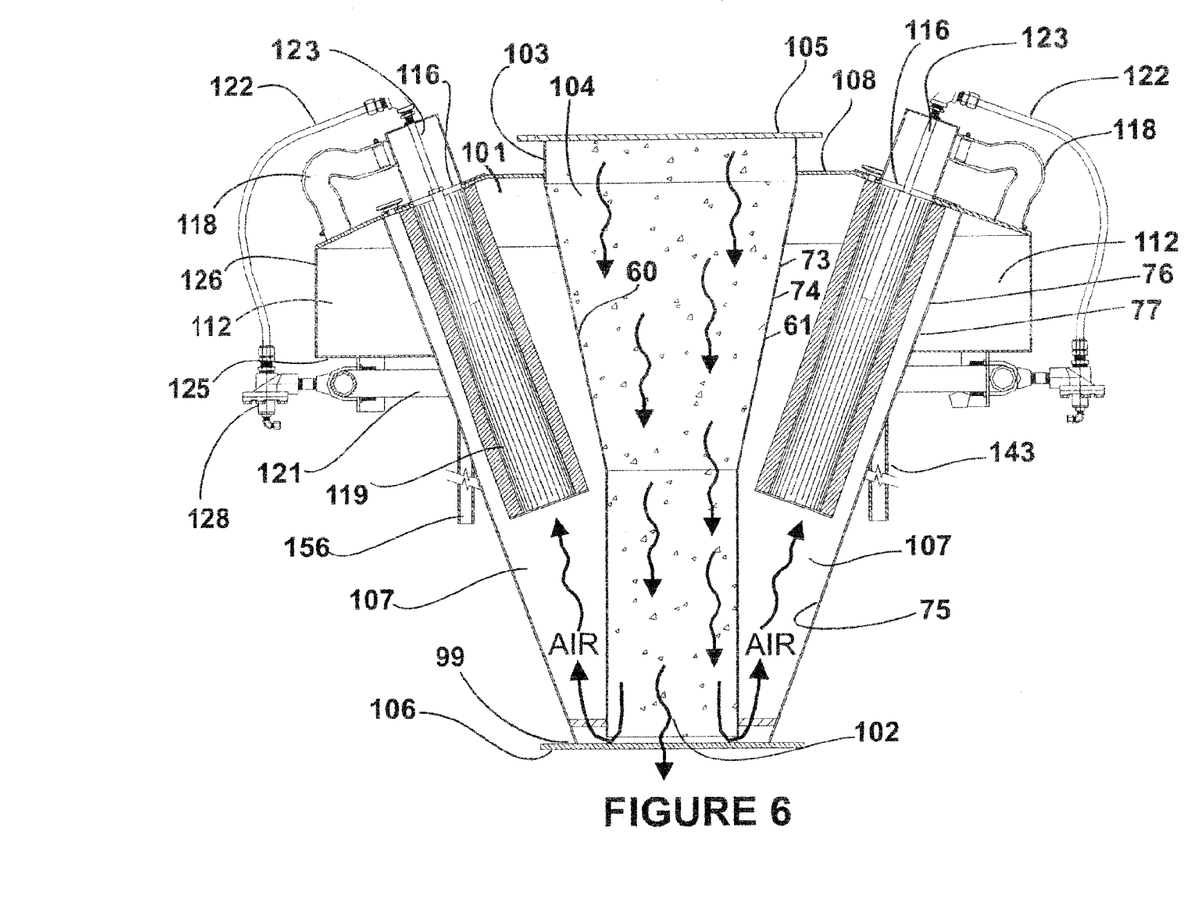
FIG. 6 is a sectional view taken along line 6-6 in FIG. 5.

One example of an embodiment using this structure is shown in FIG. 6. In this embodiment, an inverted frustroconical shaped negative pressure vessel 107 surrounds the chute 104. The negative pressure vessel 107 has an open top end 101 and a bottom end 99 which extends just past the bottom end of the chute 102 and forms a material outlet 106 which is in communication with the inlet 144 for a rotary airlock 140. A cover 108 fits over the open top end of the negative pressure vessel 101. In an advantageous embodiment of the powdered material feeder 100, the cover 108 is circular and has a top surface 115 and a bottom surface 125 with a vertical sidewall 126 therebetween. The top surface 115 extends inward and upward, forming an opening at its center 111 for the material inlet of the chute 105 to extend through. The cover 108 extends past the outer periphery of the top end of the negative pressure vessel 101.

Figure 5:
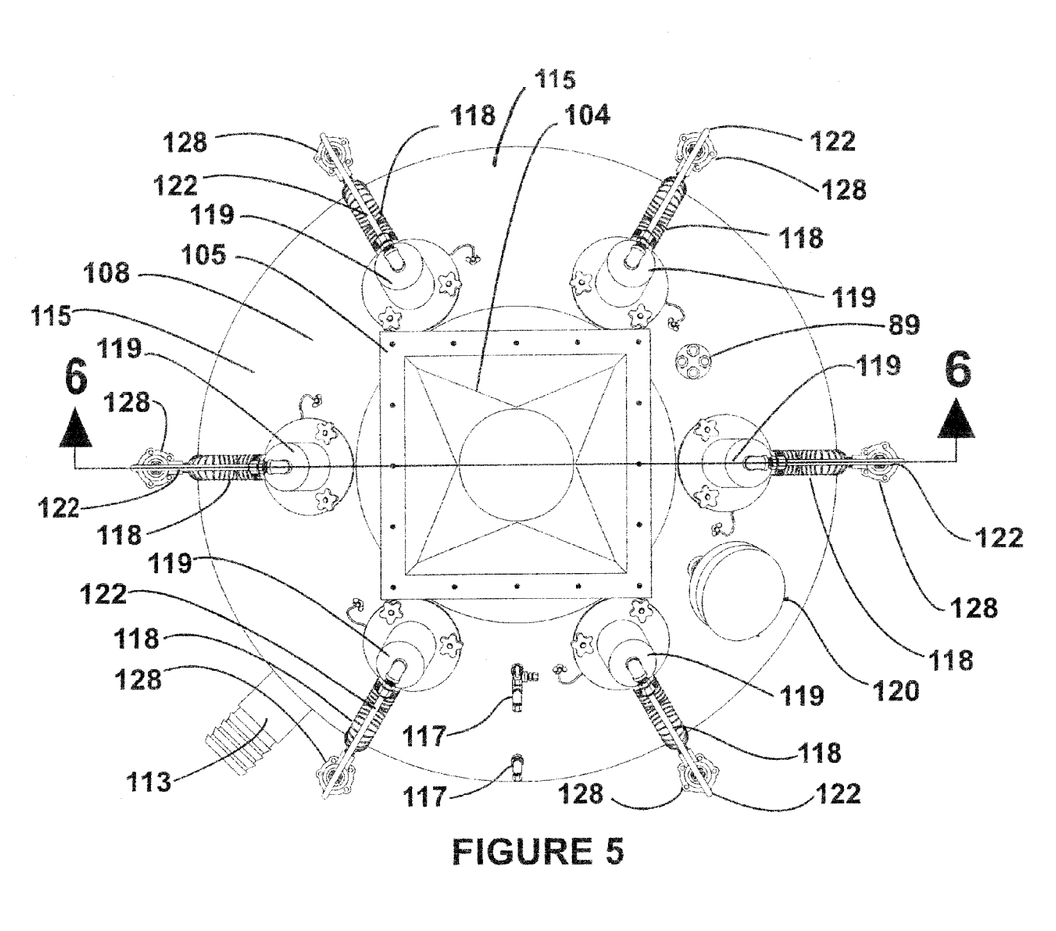
FIG. 5 is a top view of the powdered material feeder utilized by the process.

An outer compartment or tank 112 is formed by the portion of the cover 108 which extends past the outer periphery of the negative pressure vessel 107. The tank 112 is formed by the bottom surface of the cover 125, the vertical sidewall 126, a section of the top surface 115 and the negative pressure vessel 107. Extending from the sidewall 126 of the cover 108 is a connection port 113, shown in FIG. 5, onto which an exhaust fan 114 connects and provides in flow communication between the exhaust fan 114 and the tank 112. The connection port 113 may be a threaded nipple or any equivalent thereof. The exhaust fan 114 may be a centrifugal fan or other similar type of fan.

Extending from the tank 112 through the top surface of the cover 115 are a plurality of hoses 118 at radially spaced apart intervals about the periphery, which each connect to a filter element 119. The plurality of filter elements 119 are each matched to a filter hose 118. The filter elements 119 may be a cartridge or bag-like or other similar type of filter. The filter elements 119 extend through a plurality of openings 116 formed in the top surface of the cover 115 and further into the negative pressure vessel 107. As the filter elements 119 are inserted through the top surface of the cover 115, they are easily accessible for maintenance and replacement when necessary.

Within the powdered material feeder 100, the bottom end of the chute 102 extends to just above the material outlet 106 of the negative pressure vessel 107, allowing for flow communication between the negative pressure vessel 107 and the chute 104. The chute 104 guides the powdered material from the material flow measuring instrument 80 to just above the inlet 144 of the rotary airlock 140. Through the filter elements 119, the exhaust fan 114 places the tank 112, the negative pressure vessel 107 and the chute 104 under a negative pressure, drawing air, gases and powdered materials into the negative pressure vessel 107 and allowing the air and gases to exit through the filter elements 119. The negative pressure vessel 107 is monitored by a pressure indicating transmitter 120 to ensure that this tank 112 stays under a negative pressure. A diaphragm or flange fitting 130 may be utilized to connect the pressure indicating transmitter 120 to the negative pressure vessel 107 so as to protect the pressure indicating transmitter 120 from the powdered material. By having the negative pressure at the material outlet for negative pressure vessel 106, the powdered material is prompted to flow downward into the convey line.

The filter elements 119 can also be cleaned intermittently. A high pressure air source 121 is in flow communication to each of the filter elements 119. FIG. 6 shows a high pressure air source 121 located underneath the cover 108 and connected to the filter elements 119 through right angle valves 128, a hose 122 and a filter cleaning lance 123. The cleaning lance 123 is inserted to the interior of the filter element 119. The valves 128 are suitable for intermittently switching from flow communication between the high pressure air source 121 to the cleaning lances 123 to blocking flow communication between the two. When the vacuum pressure in the filter elements 119 decreases to a selected level, the filter elements 119 are pulse cleaned from the interior with high pressure air from the high pressure air source 121. This cleaning function is operated by the control system 110, which provides a logical scheme for cleaning the filter elements 119 by setting the pulse duration and time between pulses. Each of the filter elements 119 is capable of independent pulsation or cleaning which is controlled by solenoids activated by a control system 110.

If numerous filter elements 119 are utilized, the individual filter elements 119 may be cleaned independently, while the remaining filter elements 119 continue to filter. The negative pressure vessel 107 of the powdered material feeder 100 is designed so that the powdered material falling off of the exterior of the filter elements 119 during cleaning falls directly into the material outlet of the negative pressure vessel 106 into the rotary airlock 140.

On the top surface of the cover 115, an inlet port 89 may be present. This inlet port 89 is in flow communication with each of the individual exit lines 31 leading from the dump valves 18. The powdered material which flows from the nozzles 15 through the exit lines 31 may be deposited into the negative pressure vessel 107 though the inlet port 89.

Both the tank 112 and the negative pressure vessel 107 may be monitored by a pressure indicating transmitter 120. Measuring ports 117 may be present on the top surface of the cover 115 to allow for a pressure indicating transmitter 120 to monitor the filter differential by monitoring the vacuum on the intake and the exhaust side of the filter elements 119. This allows the operator to evaluate the functioning capacity of the filter elements 119. The pressure indicating transmitter 120 may be regulated by a control system 110.

The material outlet of the negative pressure vessel 106 forms a seal with the rotary airlock 140. The rotary airlock 140 continuously transfers the fed powdered material into the pressurized convey line. The rotary airlock 140 consists of a vaned rotor 141 that rotates within a closed tolerance housing to minimize air back flow. Additionally, a rotary airlock vent line 143 may be present. The vent line 143 is a pipe-like structure which may vent from the empty pocket of the rotary airlock 140 into the negative pressure vessel 107 of the powdered material feeder 100. The purpose of the rotary airlock vent line 143 is to help evacuate pressurized air received by the emptied rotary airlock 140 from the convey line before it rotates around to pick up more powdered material. If the rotary airlock vent line 143 is not present, then the rotary airlock 140 vents directly into the material outlet of the negative pressure vessel 106 of the powdered material feeder 100. The negative pressure of the negative pressure vessel 107 created by the exhaust fan 114 can also remove air from the empty pockets of the rotary airlock 140.

A transition chute 147 is mounted on the discharge 146 of the rotary airlock 140 for transferring the powdered material into the pressurized convey line 150. A convey air blower 151 is used for pressurizing and moving air into a pipeline for conveying the powdered material from the rotary airlock 140 to a burner. A variable frequency drive motor 154 may be used on the air blower 151, which allows for precise control of the air flow rates to control the feed rate of the powdered material. An air blower check valve, such as a spring-closed check valve, may or may not be utilized to prevent back flow of the powdered material/air mixture into the air blower 151. Additionally, the process may or may not use an air blower isolation valve to isolate the air blower 151 for maintenance, as well as isolating the air blower 151 whenever the process is interrupted or stopped.

An air flow monitoring instrument may or may not be utilized to monitor air flow between the air blower 151 and the rotary airlock 140. A control loop issued by the controller 110 can be employed to maintain a flow set point at the discharge of the convey air blower 151.

The invention claimed is:

1. A method for conveying a powdered material from a hopper to a convey line, comprising:
    Moving powdered material through a hopper, said hopper having an upper inlet and a lower exit port, said upper inlet and said lower exit port connected by a side wall;
    Said hopper using an air permeation system to facilitate flow of the powdered material through said lower exit port of said hopper;
    Said air permeation system including a plurality of air permeation nozzles in flow with said hopper sidewall at spaced apart intervals about the periphery thereof;
    Said air permeation nozzle receiving a flow of air through an air flow line, said flow of air interchanging between a low pressure air source and a high pressure air source to assist with the flow of said powdered material;
    Said air permeation nozzle being in flow communication with an exit line, separate from the air flow line, through which said powdered material accumulated in said nozzle flows through when said high pressure source is provided through said air flow line;
    moving said powder from said exit port of said hopper, flowing into a feeder means which includes a de-aeration vent which is under a negative pressure to facilitate the removal of air from said powdered material, thus facilitating the flow of said powdered material;
    moving said powdered material from said feeder means over a material flow measurement instrument, with the pathway to said material flow measurement instrument being under a negative pressure to remove air from said powdered material and to more accurately obtain the flow of powered material across said material flow measurement instrument;
    conveying said powdered material from said material flow measuring instrument to a powdered material feeder through gravity and negative pressure,
    said powdered material feeder being in flow communication with a negative pressure vessel, which moves said powdered material through said powdered material feeder and removes entrapped air in said powdered material;
    dropping said powdered material into a rotary airlock, having pockets for receiving said powdered material and located directly below said powdered material feeder;
    said airlock further having a vent line connected to said negative pressure vessel which evacuates pressured air in the emptied rotary airlock pocket before it rotates around to pick up said powdered material from said powdered material feeder;
    continuously dispensing said powdered material from said rotary airlock a pneumatic conveying system.

2. The method for conveying a powdered material from the hopper to a convey line of claim 1, wherein each of said air permeation nozzles are in flow communication with an independent regulator assembly which regulate the flow of said low and high pressure air source to each of said air permeation nozzles, independent of said remaining air permeation nozzles, to further facilitate the flow of said powdered material through said hopper.

3. The method for conveying a powdered material from the hopper to a convey line of claim 1, wherein said exit line is closed when said air permeation nozzles are receiving said low pressure air.

4. A method for conveying a powdered material from a hopper to a convey line, comprising;
    moving powdered material through a hopper having an air permeation system to assist in facilitating the flow of the powdered material through said hopper;
    alternately providing low pressure air and high pressure air into the hopper through the air permeation system;
    allowing powdered material which accumulates in said air permeation system to exit through a separate exit line of said air permeation system; said exit line not used to deliver said low and high pressure air;
    moving said powdered material through a feeder means and over a material flow instrument while under said negative pressure;
    moving said powdered material through a negative pressure vessel and removing entrapped air from said powdered material by said negative pressure;
    dropping said powdered material into a rotary air lock having a vent line connected to said negative pressure vessel which evacuates pressured air in the emptied rotary air lock pocket before it rotates to accept said falling powdered material from said negative pressure vessel;
    continuously dispensing said powdered material from said rotary air lock into a pneumatic conveying system.

* * * * *